(12) United States Patent
Longshaw

(10) Patent No.: US 9,218,378 B2
(45) Date of Patent: Dec. 22, 2015

(54) METHOD OF INDEXING A DATABASE

(71) Applicant: Data-Re Limited, Milton Keynes, Buckinghamshire (GB)

(72) Inventor: Thomas Benjamin Longshaw, Worcester (GB)

(73) Assignee: Zizo Software Limited, Bletchley (GB)

( * ) Notice: Subject to any disclaimer, the term of this patent is extended or adjusted under 35 U.S.C. 154(b) by 532 days.

(21) Appl. No.: 13/744,060

(22) Filed: Jan. 17, 2013

(65) Prior Publication Data

US 2013/0198199 A1    Aug. 1, 2013

(30) Foreign Application Priority Data

Jan. 20, 2012    (GB) .................................. 1200946.0

(51) Int. Cl.
    *G06F 17/30*    (2006.01)
    *G06F 7/24*    (2006.01)

(52) U.S. Cl.
    CPC .... *G06F 17/30312* (2013.01); *G06F 17/30324* (2013.01); *G06F 17/30595* (2013.01); *G06F 7/24* (2013.01)

(58) Field of Classification Search
None
See application file for complete search history.

(56) References Cited

U.S. PATENT DOCUMENTS

| | | | | |
|---|---|---|---|---|
| 4,507,752 A * | 3/1985 | McKenna | ......... | G06F 17/30958 1/1 |
| 5,712,970 A * | 1/1998 | Arnott | ................. | G06F 11/1666 711/113 |
| 7,194,456 B2 | 3/2007 | Longshaw | | |
| 7,689,541 B1 * | 3/2010 | Le Grand | .................. | G06F 7/24 707/999.002 |
| 7,702,640 B1 * | 4/2010 | Vermeulen | ........ | G06F 17/30336 707/999.1 |
| 7,801,903 B2 * | 9/2010 | Furusho | ............ | G06F 17/30486 707/752 |
| 7,895,216 B2 * | 2/2011 | Longshaw | ........ | G06F 17/30327 707/752 |
| 8,094,157 B1 * | 1/2012 | Le Grand | .................. | G06F 7/24 345/501 |
| 8,271,452 B2 * | 9/2012 | Longshaw | .......... | G06F 11/1471 707/664 |
| 8,312,050 B2 * | 11/2012 | Draese | ............. | G06F 17/30501 707/793 |
| 2003/0174717 A1 * | 9/2003 | Zabarski | ................. | H04L 45/00 370/401 |
| 2006/0265379 A1 * | 11/2006 | Furusho | ............ | G06F 17/30324 1/1 |
| 2007/0106876 A1 * | 5/2007 | Goswami | .......... | G06F 17/30336 711/216 |
| 2010/0235365 A1 * | 9/2010 | Newby, Jr. | ................ | G06F 7/24 707/752 |
| 2013/0054599 A1 * | 2/2013 | Lewis, Jr. | .......... | G06F 17/30312 707/737 |
| 2013/0179470 A1 * | 7/2013 | Yasuoka | ........... | G06F 17/30498 707/792 |
| 2013/0282728 A1 * | 10/2013 | Longshaw | ........ | G06F 17/30321 707/741 |

\* cited by examiner

*Primary Examiner* — Richard Bowen
(74) *Attorney, Agent, or Firm* — Levy & Grandinetti

(57) ABSTRACT

A method of sorting a database of records and data items, in which each record has an identifier, data variables and paths pointing to data items being the value of the data variables is disclosed. The database has a first and second frequency for each path of the first and second data variables, respectively. The method includes creating an intermediate array having a section for each value of the second data variable. Storing the identifier of each record. Creating a final array having sections for each value of the first data variable. Storing the identifier of the records into the section of the final array corresponding to the value of its first data variable. Identifying break points in the final array. Repeating the previous two steps for each section of the intermediate array. Creating a break point index.

8 Claims, 9 Drawing Sheets

| Record ID | Path to First Colour | Path to Second Colour | Path to Third Colour |
|---|---|---|---|
| T1 | P2 | P1 | P4 |
| T2 | P5 | P3 | P1 |
| T3 | P5 | P1 | P2 |
| T4 | P3 | P1 | P4 |
| T5 | P3 | P1 | P4 |
| T6 | P2 | P2 | P2 |
| T7 | P5 | P1 | P4 |
| T8 | P2 | P3 | P2 |
| T9 | P3 | P3 | P2 |
| T10 | P2 | P3 | P1 |
| T11 | P2 | P2 | P2 |
| T12 | P5 | P2 | P4 |
| T13 | P5 | P1 | P1 |
| T14 | P5 | P1 | P2 |
| T15 | P2 | P1 | P4 |
| T16 | P2 | P1 | P2 |

110

| Path | Colour |
|---|---|
| P1 | R |
| P2 | G |
| P3 | B |
| P4 | O |
| P5 | Y |

120

100

| Path | Frequencies for First Colour |
|---|---|
| P2 | 7 |
| P3 | 3 |
| P5 | 6 |

131

| Path | Frequencies for Second Colour |
|---|---|
| P1 | 9 |
| P2 | 3 |
| P3 | 4 |

132

| Path | Frequencies for Third Colour |
|---|---|
| P1 | 3 |
| P2 | 7 |
| P4 | 6 |

| Location | Record ID | Path to First Colour PFC | Path to Second Colour PSC | Path to Third Colour PTC |
|---|---|---|---|---|
| L1 | T1 | P2 | P1 | P4 |
| L2 | T3 | P5 | P1 | P2 |
| L3 | T4 | P3 | P1 | P4 |
| L4 | T5 | P3 | P1 | P4 |
| L5 | T7 | P5 | P1 | P4 |
| L6 | T13 | P5 | P1 | P1 |
| L7 | T14 | P5 | P1 | P2 |
| L8 | T15 | P2 | P1 | P4 |
| L9 | T16 | P2 | P1 | P2 |
| L10 | T6 | P2 | P2 | P2 |
| L11 | T11 | P2 | P2 | P2 |
| L12 | T12 | P5 | P2 | P4 |
| L13 | T2 | P5 | P3 | P1 |
| L14 | T8 | P2 | P3 | P2 |
| L15 | T9 | P3 | P3 | P2 |
| L16 | T10 | P2 | P3 | P1 |

| Location | | Record ID | Path to First Colour PFC | Path to Second Colour PSC | Path to Third Colour PTC |
|---|---|---|---|---|---|
| IS1 | L1 | T2 | P5 | P3 | P1 |
| | L2 | T10 | P2 | P3 | P1 |
| | L3 | T13 | P5 | P1 | P1 |
| IS2 | L4 | T3 | P5 | P1 | P2 |
| | L5 | T6 | P2 | P2 | P2 |
| | L6 | T8 | P2 | P3 | P2 |
| | L7 | T9 | P3 | P3 | P2 |
| | L8 | T11 | P2 | P2 | P2 |
| | L9 | T14 | P5 | P1 | P2 |
| | L10 | T16 | P2 | P1 | P2 |
| IS3 | L11 | T1 | P2 | P1 | P4 |
| | L12 | T4 | P3 | P1 | P4 |
| | L13 | T5 | P3 | P1 | P4 |
| | L14 | T7 | P5 | P1 | P4 |
| | L15 | T12 | P5 | P2 | P4 |
| | L16 | T15 | P2 | P1 | P4 |

| Break Point Index | | | | | | | | | | | |
|---|---|---|---|---|---|---|---|---|---|---|---|
| N2 | N4 | N6 | N7 | N8 | N10 | N11 | N12 | N14 | N15 | N16 | ⟩ 930 |

Fig. 9

METHOD OF INDEXING A DATABASE

This Application claims priority to Great Britain Application Number 1200946.0 filed on Jan. 20, 2012.

The present invention relates to a method of indexing a database by records of at least equal first and second data variables.

So-called "pattern databases" having records comprising pointers to data rather than the data itself are known. Pointing to data allows it to be stored only once, reducing the amount of memory required. The larger the database, the greater the advantage. The pointers can point directly to the data, or do so via a tree structure as in U.S. Pat. No. 7,194,456. It is also known to have a structure in which each "node" of the tree has multiple branches.

It is often required to sort records in a pattern database by a first data variable, and then by second data variable. The database is scanned and a table is produced with the records sorted into sections according to the value of the first data variable, with sub-sections according to the value of the second data variable. To allow for groups of identical records to be located in the table, a break point index is created of all the points therein where there is a difference between adjacent records. As such, adjacent break points in the index define groups of records with identical values of first and second data variable. The definition of such groups of records can be for searching, joining or otherwise distinguishing between records.

A problem with this approach is the number of steps required to arrive at the break point index. To locate the break points a comparison is made between every adjacent pair of records in the table to determine if there is a difference. This can take a very long time with a large database. Further, a number of steps are required to create the index to store the break points, to avoid consuming excessive memory space with an unpopulated index. One method is to conduct a first comparison scan as described above to count the number of break points, and to create an index of the required size. A second comparison scan is then conducted to populate the index. This process is slow. Alternatively, an index can be created with a safe upper limit which is then populated, but this requires a large amount of spare RAM which may not be available. A compromise is to create small index blocks, of say 1000 rows, and to create new ones each time a block is filled. Less RAM is needed, but it is sill not optimal.

The present invention is intended to overcome some of the above problems.

Therefore, according to a first aspect of the present invention, a method of indexing a database comprising a plurality of records and a plurality of data items, in which each record comprises an identifier, first and second data variables and paths pointing to data items being the value of said data variables, in which the database further comprises a first frequency for each path of the first data variable, and a second frequency for each path of the second data variable, comprises the following steps:

creating an intermediate array comprising a section for each value of the second data variable, which sections comprise identifier storage locations equal in number to the corresponding second frequency;

storing the identifier of each record into the section of the intermediate array corresponding to the value of its second data variable;

creating a final array comprising sections for each value of the first data variable, which sections comprise identifier storage locations equal in number to the corresponding first frequency;

storing the identifier of the records appearing in a first section of the intermediate array into the section of the final array corresponding to the value of its first data variable;

identifying break points in the final array corresponding to the last record stored into each section thereof in the previous step;

repeating the previous two steps for each further section of the intermediate array.

creating a break point index comprising the break points identified in each repetition.

Thus, the method of the invention involves a reduced number of operations to arrive at the break point index. Instead of sorting the records into a table and then comparing each adjacent record to discern differences indicative of a break point, the break points are identified during the sorting process itself. This is done by storing the records in the final array in separate steps, and each time identifying the break points as those locations in the final array up to which records have just been stored. These locations are a function of the first frequencies, which establish the sections of the final array, and a function of the structure of the intermediate array, which itself is derived from the second frequencies. This method involves fewer steps than in the prior art and considerably speeds up the process, in particular in large pattern databases.

The table (the final array) is sorted, and the break points identified, by repeated sorting of one data variable at a time. A sort defined by just one data variable can be expressed as the equation:

$$(T',B') = \text{sort}(T,v,B),$$

where T is a potential table (array) and T' a table sorted by first data variable. B the potential break points in T and B' the identified break points in T', and v the first data variable to sort by. An equivalent sort defined by two data variables can be expressed as the equation:

$$\text{sort}(T,[v1,v2],B) = (\text{let}(T',B') = \text{sort}(T,v2,B) \text{ in } \text{sort}(T',v1,B'))$$

where v1 is the first data variable to sort by and v2 the second data variable to sort by. Therefore, the second equation comprises repeated application of the first equation. Taking this further, a sort according to the method of the invention can be expressed as the equation:

$$\text{sort}(T,v,B) = \text{let}(T',O') = \text{sort}(T,v,O) \text{ in } (T,\text{remap}(B,O,O'))$$

where O is the potential offsets (break points) of v (the first data variable) in T, and O' is the same set of offsets after the sort is complete (the equivalent of the break point index described above). The novel part of the present invention is the remap (B,O,O'), by which the break point index is calculated from an old set of break points (those in the intermediate array) and the pre and post sort offsets. As such the break point index is not derived from the data itself which is stored in the sorted table, as in the prior art. It will be appreciated that the method of the present invention is more complex than the above equation because it involves folding the second operation into the first, because B' is calculated during the population of the final array, and not afterwards.

It will be appreciated that with the method of the invention the break points include those in the final array at which the second data variable changes, as well as those in the final array at which the first data variable changes. This occurs because the final time break points are identified in the final array once it is fully populated are necessarily those between the sections of the final array, which are differentiated by first data variable. Indentifying both kinds of break point is essential, because while in most instances a change in the first data variable will be accompanied by a change in the second data variable, this may not occur if a particular section of the final array comprises zero records with particular values of second data variable and the first record thereof has the same value of second data variable as the final record in the preceding section. If so, only change in the value of the first data variable will differentiate between the groups of records.

After the step of creating the final array an offset array can be created comprising storage locations for each value of the first data variable, which can be discerned from the number of first frequencies. These storage locations can be populated with offset values which point to the first available identifier storage location in each section of the final array. These are used to identify the correct location to store records, and each time an identifier of a record is stored into a section of the final array the corresponding offset value can be incremented. As such, the offset values can be used to identify the break points after each stage of the populating of the final array with records from the intermediate array, because they point to the next available location in each section, and therefore correspond with the last record stored in each section.

Further, in the step of storing the identifier of the records appearing in a section of the intermediate array into the section of the final array corresponding to the values of the data variable in question, a count can be made of the number of said offset values which change. After that step a break point set can be created comprising storage locations equal in number to said count. After the step of identifying break points in the final array (by reference to the offset values as described above), these can then be stored in said storage locations of said break point set. An optimal amount of RAM is used here because if one or more sections of the final array are not populated during this step, because there are no records with that particular value of first data variable in the section of the intermediate array being processed, then no RAM is wasted supporting break point set storage locations which prove redundant. This process is repeated each time records of a section of the intermediate array are stored in the final array. At the end the break point sets which have been created are combined to form the break point index.

In addition, it will be appreciated that by identifying the break point sets during the stages of the sorting procedure, there is no need to generate and support a large break point index to be populated with data, as in prior art methods, which consumes excessive RAM. In fact, the method of the invention only uses the exact storage space required for each break point set, so the optimal amount of RAM is used.

The break point index is the same as that produced by prior art methods, and adjacent break points thereof define particular groups of records with an equal value of first data variable and an equal value of second data variable. As described above the definition of such records can be for searching, joining or otherwise distinguishing between records.

In a preferred embodiment the paths comprised in each record can also be stored in the intermediate and final arrays. Further, the sections of the intermediate array can be arranged in a pre-determined second path order, and the sections of the final array can be arranged in a pre-determined first path order. As the intermediate array is converted section by section into the ordered sections of the final array, the final array is arranged by first path order, sub-divided by second path order. This structure can allow for the location of particular groups of records in the final array to be identified.

It will be appreciated that in practice records stored in a database comprise more than just two data variables. Therefore, in one embodiment of the invention each record can also comprise one or more further data variables, the database can comprise one or more further frequencies for each path of the one or more further data variables, and the method can comprise creating a sequence of final arrays, each one according to the method of claim 1, but in which the intermediate array produced in the first two steps of the method is replaced with the final array produced in the preceding repetition of the method. Therefore, each time the records are stored in the final array, this is broken into steps according to the break point index produced in the preceding repetition of the method, with the result that a greater number of steps is required to create each final array in the sequence.

In addition, the method can comprise creating a sequence of final arrays, each one according to the method of claim 3, which deals with the creation of the break point sets. In each repetition the creation of the break point sets is the same process, except that with each further repetition of the method the number of sets will incrementally increase, because the number of sections of the intermediate array (the final array produced in the preceding repetition of the method) increases. In order to avoid unnecessary usage of RAM, the break point sets created each time can be deleted once the next break point index is arrived at.

As before, the paths comprised in each record can be also stored in each final array in the sequence, and the sections of each final array in the sequence can be arranged in pre-determined first path orders.

According to a second aspect of the present invention there is provided a computer system storing a database comprising a plurality of records and a plurality of data items, in which each record comprises an identifier, first and second data variables and paths pointing to data items being the value of said data variables, and in which the database further comprises a first frequency for each path of the first data variable, and a second frequency for each path of the second data variable; in which the computer system is configured to perform the method of any of claims 1 to 7 below.

According to a third aspect of the invention them is provided a computer program product storing a program for carrying out the method of any of claims 1 to 7 below.

Two embodiments of the invention will now be described with reference to the accompanying drawings, in which:

FIG. 1a is a diagrammatic view of a database with which embodiments of the invention may be performed;

FIG. 1b is a diagrammatic view of a computer system storing the database of FIG. 1a;

FIG. 3 is a diagrammatic view of an intermediate array according to a step of the method shown in FIG., 2;

FIG. 6 is a diagrammatic view of an intermediate array according to a step of the method show in FIG. 5;

(The following description involves a diagrammatic explanation of the method of the invention which is intended to illustrate the mathematical principals at work in a simple way. It will be appreciated that in practice the method of the invention will be performed by a computer, and the manner in which the data is manipulated and processed to carry out the steps of the invention may not adhere to the simple rationale given below. Any known computer programming method can be used to put the invention into practice, and it will be down to the individual programmer and the software and/or hardware used. All that is required is that the computer sort the data in the manner described below, and then extract the relevant information from it according to the described principles.)

FIG. 1a shows a database 100 comprising a plurality of records T1-T16 in a table 110. Each record relates to a product with three coloured parts. The first part may be green, blue or yellow, the second red, green or blue, and the third red, green or orange. Each record has a unique identifier T1-T16, and three data variables, namely Path to First Colour, Path to Second Colour, and Path to Third Colour. The values (colours) of the data variables of each record T1-T16 are one of paths P1-P5. These are stored in table 120, in which path P1 points to data item R (Red), path P2 to data item G (Green), path P3 to data item B (Blue), path P4 to data item O (Orange), and path P5 to data item Y (Yellow). Thus instead of storing the data item R twelve times in table 110, it is only stored once in table 120.

Frequencies, being the number of instances of each path of the three data variables are stored in tables 131-133. Table 131 contains frequencies for the three particular colours of the first part, table 132 those for the second, and table 133 those for the third. Tables 131-133 are created when the records T1-T16 are entered into table 110. When new records are added the appropriate frequencies are increased. If a record has a new colour, then a new path (e.g. P6) for that colour is stored as a new line in table 120, and a new line is stored in the table 131-133 corresponding to the part of the product in question.

Figure 1B:
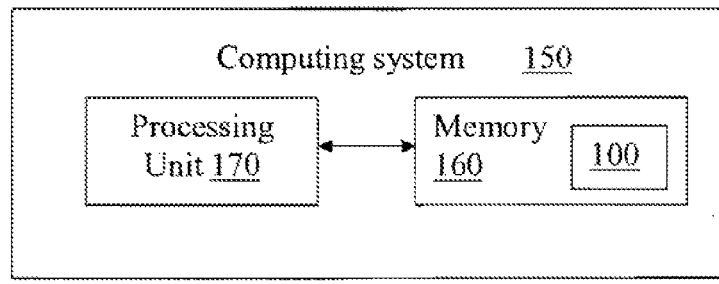

FIG. 1b shows the database 100 stored in a memory 160 of a computer system 150. Preferably, the memory 160 is a random access memory so the data in the database can be easily accessed. A processing unit 170 is connected to the memory 160 for controlling the data in the database 100, and is programmed to run certain types of operations on the database 100 when required.

Figure 2:
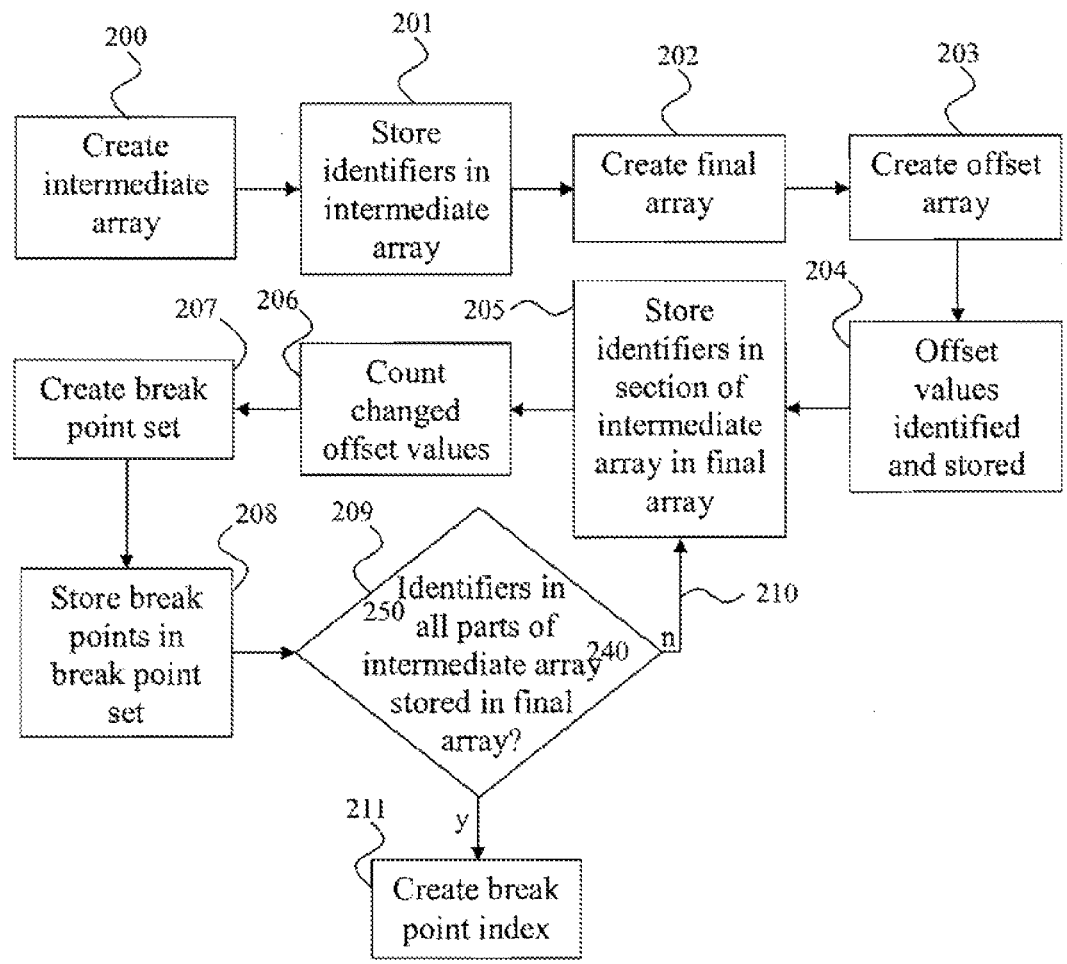
FIG. 2 is a flow diagram of a first method of indexing a database according to the invention.

The database 100 is indexed according to the flow diagram shown in FIG. 2. In particular, in a first step 200 an intermediate array 300 is created, as shown in FIG. 3. It comprises 16 locations L1-L16, because there are 16 records T1-T16 in the database 100. It comprises three sections IS1-IS3, because there are three values of data variable in table 132, and each section has a number of locations equal to the corresponding frequency in table 132. Further, the sections IS1-IS3 are arranged in the same order the values appear in table 132. Therefore, the intermediate array 300 has first section IS1 corresponding to the path P1 of the second data variable, which has nine locations L1-L9, because the path count total for P1 in table 132 is 9. Likewise, the second and third sections IS2 and IS3 have 3 and 4 locations respectively.

In a second step 201a full scan of the database 100 is carried out, and the records T1-T16 stored in the section IS1-IS3 of the intermediate array 300 corresponding to the path of their second data variable. Each record T1-T16 is stored in the next available location in the relevant section IS1-IS3.

Figure 4:
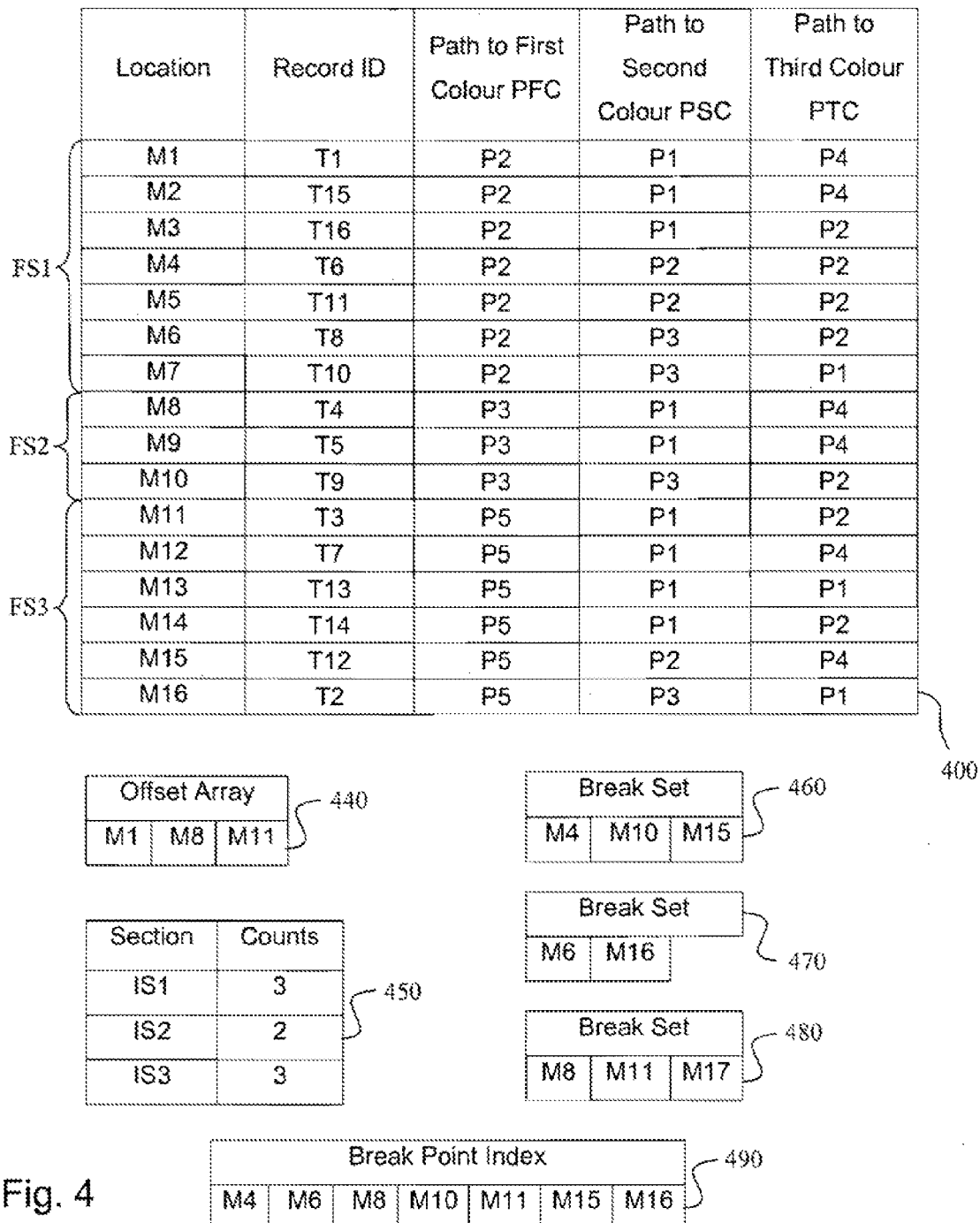
FIG. 4 is a diagrammatic view of a final array according to a step of the method shown in FIG. 2.

In a third step 202 a final array 400 is crated, as shown in FIG. 4. Again, it comprises 16 locations M1-M16, and three sections FS1-FS3, because there are three values of data variable in table 131. Each section has a number of locations equal to the corresponding frequency in table 131, and they are arranged in the same order the values appear in table 131.

In a fourth step 203 an offset array 440 is created, which comprises storage locations for each value of the first data variable, namely three because there are three values in table 131.

In a fifth step 204 offset values are identified in the final array 400 which point to the first available location in each section FS1-FS3, i.e. location M1 for the first section. M8 for the second, and M11 for the third, and these are then stored in the offset array 440.

In a sixth step 205 the nine records in the first section 181 of the intermediate array 300 are stored in the appropriate sections FS1-FS3 of the final array 400 corresponding to the path of their first data variable. Records T1, T15 and T16 are stored in the first section FS1 because they have path P2 for the first data variable, records T4 and T5 are stored in section FS2 and records T3, T7, T13 and T14 in section FS3 accordingly. The offset values increment to the next available location each time a record is stored in their section FS1-FS3. Therefore, at the end of this first stage the offset values point to M4, M10, and M15.

In a seventh step 206 a count is made of the number of offset values which have changed in the offset array 440. In this case all three have changed because section 1S1 of the intermediate array 300 contained records with all three types of first data variable value in table 131. The count total is stored in the first row of count table 450.

In an eighth step 207 a break point set 460 is created comprising storage locations equal in number to the count total stored in the first row of table 450, namely three.

In a ninth step 208 break points are stored in the break point set 460, which correspond to the position of the offset values in the offset array 440 at that point, namely M4, M10 and M15.

In a tenth step 209 it is checked if all the records in the intermediary array 300 are stored in the final array 400. As this is not the case the method loops at 210 back to sixth step 205, to store the records of the second section IS2 of the intermediate array 300 into the appropriate sections FS1-FS3 of the final array 400. Records T6 and T11 are stored in the first section FS1 because they have path P2 for the first data variable, and record T12 is stored in section FS3. No records are stored in section FS2 because there are none with paths P3 and P2 as the values of first and second data variables thereof. As such, when the seventh step 206 is repeated the count of offset values which have changed is only two, and this is entered into a row of table 450. When the next break point set 470 is created when the eighth step 207 is repeated it comprises only two storage locations, as that is all that will be necessary. The offset values in the offset array 440 which have changed are then entered, namely M6 and M16. Therefore, break point set 470 only requires sufficient RAM to support the data it will be required to retain, and no RAM has been wasted supporting a third storage location in break point set 470. In this example such a saving is obviously negligible, but in practice with a very large database, these method steps can save an enormous amount of RAM.

The tenth step 209 is repeated, followed again by sixth to ninth steps 205-208 for the third section IS3 of the intermediate array. By the end of this third repetition the offset values in the offset array 440 point to locations M8, M11 and M17, which are then stored in the break point set 480.

When the tenth step 209 is repeated it is determined that all the records in the intermediate array 300 are now stored in the final array 400. As such, the method moves to an eleventh step 211, in which the break point index 490 is created by combining the break point sets 460-480. The final break point M17 is not stored in the break point index 490 as it simply signifies the end of the final section of records, and is not required. (Although the method has been illustrated using a decision step 209, in practice the method may be implemented by reading through the whole of the intermediate array 300 sequentially and storing all the records section by section into the final array 400.)

The final array 400 now contains all the records T1-T16 arranged in an order of the values of the first data variable, each sub-divided by the values of the second data variable, and the break point index 490 indicates where each subsection of records can be found in the final array 400. It will be appreciated that the break point index 490 is known as soon as the final array 400 is complete, and no further steps are required to determine it, as in the prior art. This indexed table 400, 490 can be used for searching, combining or distinguishing groups of data as desired.

The above described method is very simple, and in practice there will be far greater numbers of records in a database, and queries relating to more than just two data variables. In order to illustrate how the method of the invention deals with such multiplex queries a second method will now be described with reference to FIGS. 5 to 9. This second method applies to the same database 100 referred to above, and the same records T1-T16 stored therein.

Figure 5:
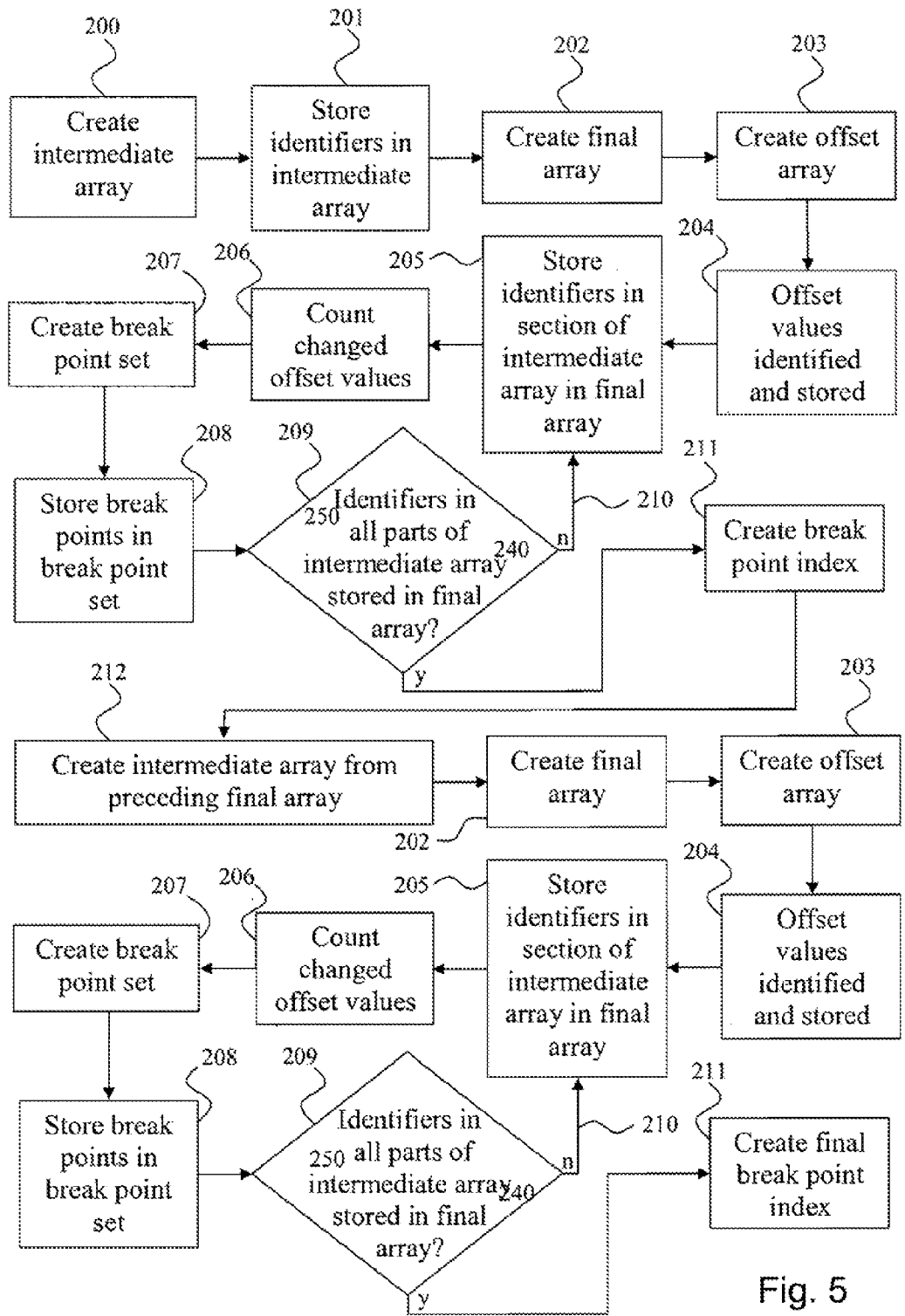
FIG. 5 is a flow diagram of a second method of indexing a database according to the invention.
Figure 7:
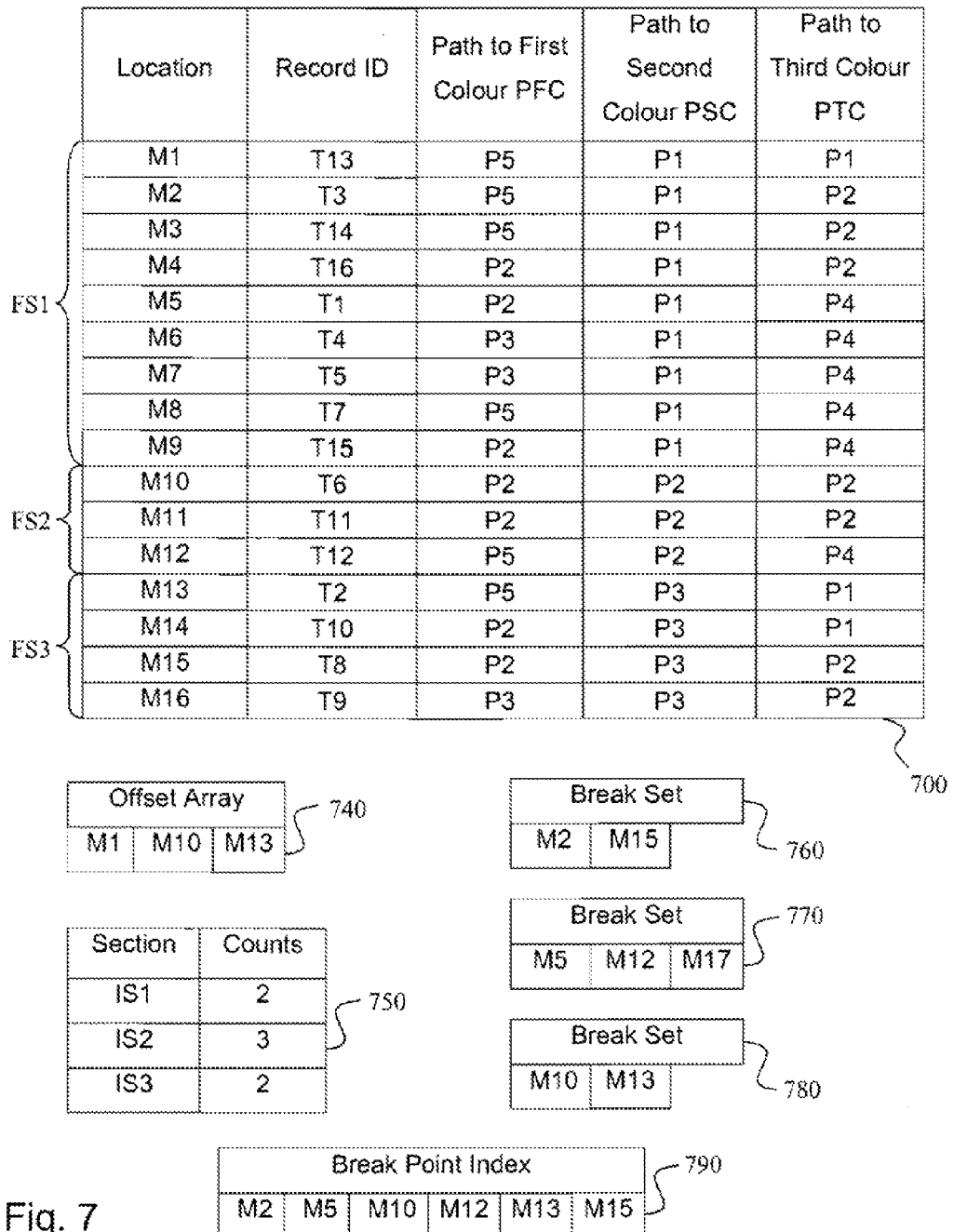
FIG. 7 is a diagrammatic view of a first final array according to a step of the method shown in FIG. 5.

The flow diagram of FIG. 5 comprises two repetitions of the method illustrated by the flow diagram of FIG. 2, but in which in the second repetition the intermediate array produced in the first two steps of the method is replaced with the final array produced in the preceding repetition. The first to eleventh steps 200 to 211 are the same as those shown in FIG. 2, and the same reference numerals are used. However, the method is applied to the third and second data variables of the records in the database 100 as opposed to the second and first as previously. As such, in first step 200 intermediate array 600 as shown in FIG. 6 is created, which is the same as intermediate array 300 described above, except that it comprises three sections IS1-IS3 for the three values of data variable in table 133, each of which has a number of locations equal to the corresponding count total in table 133, and which are arranged in the same order the values appear in table 133. Steps 201 to 211 are carried out, generating offset array 740, count table 750, break point sets 760, 770 and 780, and break point index 790, all shown in FIG. 7.

in this case, when the records of sections IS1 and IS3 of the intermediate array 600 stored into the final array 700, only two of the three offset values in the offset array 740 change, because sections IS1 and IS3 comprise only two different values of second data variable. As such, the first and third entries in table 750 are 2, and the break point sets 760 and 780 comprise only two storage locations. Furthermore, the break point index 790 only comprises a total of six entries.

In the second repetition of the method of FIG. 2 illustrated in FIG. 5 there are no steps 201 and 202 of creating and populating an intermediate array. Instead the final array 700 is used, as shown in step 212. As explained above, this final array 700 is already sorted by the second and third data variables, and comprises seven sections, defined by the six break points in the index 790. These sections are FS1-FS3 sub-divided by the groups of values of third data variable therein, of which there are three in FS1 and two in each of FS2 and FS3.

The third to tenth steps 202 to 209 are then carried out in the second repetition as shown in FIG. 5, but this time step six 205 involves only storing the records of each sub-section of the final array 700 at a time, as defined by adjacent sets of break points in the break point index 790. As such, step ten 209 loops back to step six 205 seven times. On the first occasion the records up to break point M2 of final array 700 are stored in the final array 800 shown in FIG. 8, and this comprises only record T13, which goes into section FS3 of the final array 800 because its value of first data variable is P5. As such only one offset value in offset array 840 changes, resulting in a count of one in count table 850, and a break point set 860 with only one storage location, for offset value N12. The section of final array 700 which has been processed is effectively FS1,IS1 because it relates to records appearing in section FS1 of final array 700, which also appeared in section IS1 of intermediate array 600. This is illustrated in the count table 850.

On the second occasion the records between break points M2 and M5 of the final array 700 are processed (FS1,IS2) with records 13 and 114 being stored in section FS3 of final array 800 and record T16 going into section FS1. As such, two offset values in offset array 840 change and break point set 870 has two storage locations for offset values N2 and N14. Next, records between M5 and M10 of the final array 700 are processed (FS1,IS3), resulting in three offset value changes, and break point set 880 for offset values N4, N10 and N15.

At this point it should be noted that the next section of final array 700 to be processed is FS2,IS2 because there are no records which appeared in section FS2 of final array 700 which appeared in section IS1 of intermediate array 800. This is because there are no products with the colours green and red for their second and third colours. As such, by its nature this process wastes no RAM supporting data storage for record types which do not exist, rather it simply moves from section to section according to differences in the records, without the need to determine the nature of any difference.

Figure 8:
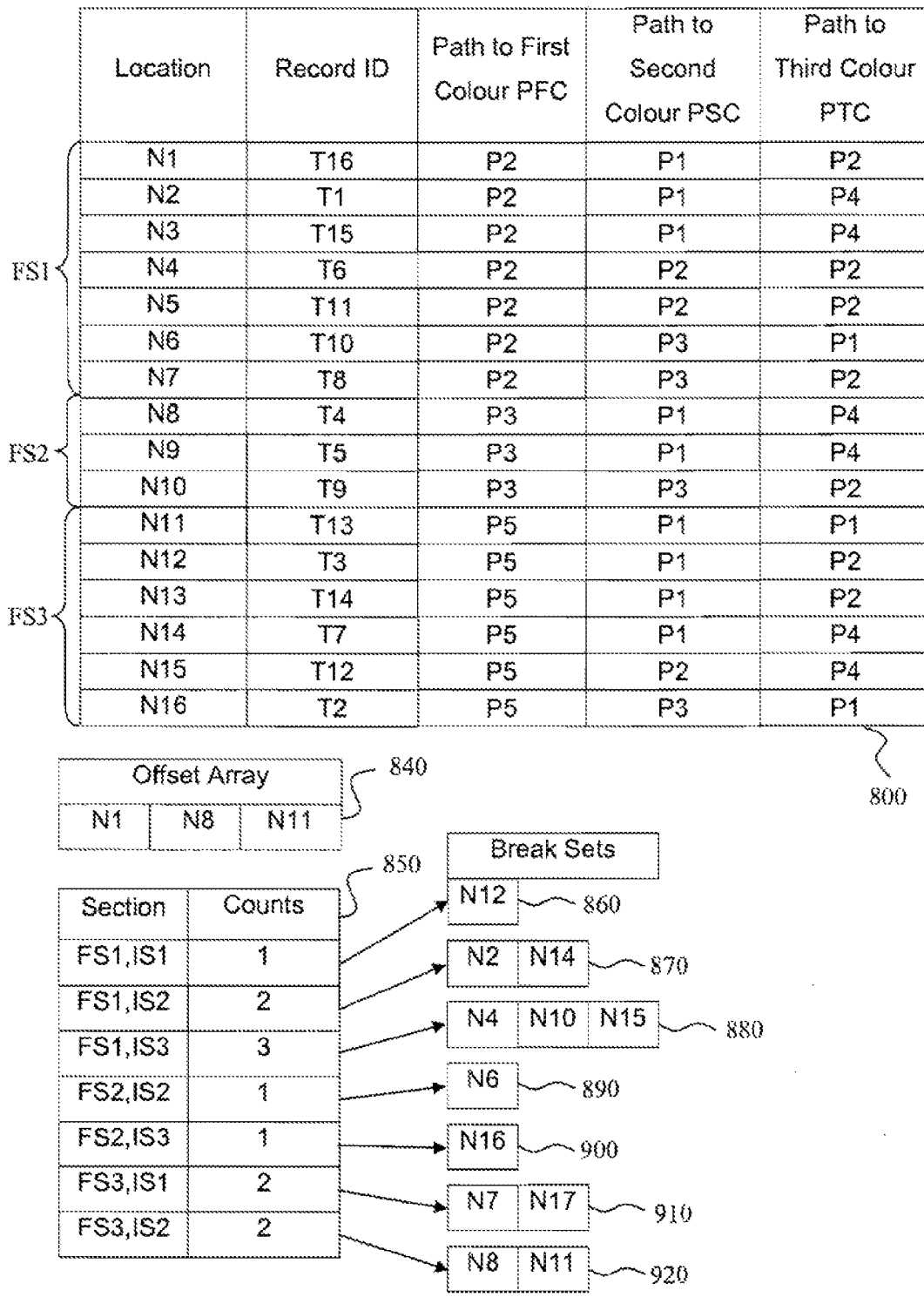
FIG. 8 is a diagrammatic view of a second final array according to a step of the method shown in FIG. 5; and, FIG. 9 is a diagrammatic view of a break point index according to a step of the method shown in FIG. 5.

As is clear from FIG. 8, the last four processing steps deal with sections FS2,IS2: FS2,IS3; FS3,IS1 and FS3,IS2, generating break point sets 890, 900, 910 and 920, which comprise one, one, two and two storage locations respectively.

In the final step 211 the final break point index 930 shown in FIG. 9 is created from the break point sets 860-920. This final break point index 930 comprises 11 entries, defining the 12 separate record groups now sorted in the final array 800. Due to the order the records have been stored they are arranged in an order of the values of the first data variable, sub-divided by the values of the second data variable, subdivided by the values of the third data variable, all according to the path orders in tables 131-133. As before, it will be appreciated that the break point index 930 is known as soon as the final array 800 is complete, and no further steps are required to determine it, as in the prior art. This indexed table 800, 930 can be used for searching, combining or distinguishing groups of data as desired.

The above described method is illustrative of the manner in which the method of the invention can handle multiple data variables. It will be appreciated that any number of repetitions of the second part of the method of FIG. 5 can be carried out in a sequence, according to the number of equal values of data variables to be indexed, each time employing the final array generated in the preceding repetition as the starting point. The relationship between each final array is the same as that between the final arrays 700 and 800 described above, with each being sub-divided by one further data variable each time. The resulting break sets and break point indexes could be very large, but the key factors are that they are only ever as large as they need to be to host the actual break points, and they are generated during the sorting process, eliminating the need to do so afterwards. This can make the indexing process far faster and more efficient than prior art methods.

The second and third aspects of the invention relate to a computer system configured to perform the method of any of claims 1 to 7, and to a computer program product storing a program for carrying out the method of any of claims 1 to 7. The above description provides full support for these further aspects of the invention, because it will be appreciated how a computer can be configured to carry out the methods, and how a program for performing the method can be carried on a product.

Therefore, the invention provides a method of indexing records in a database by at least equal values of first and second data variable which involves no time-consuming comparison scanning post-sort.

The invention claimed is:

1. A method of sorting a database comprising a plurality of records and a plurality of data items, in which each record comprises an identifier, a first data variable as a first path pointing to a data item being a value of said first data variable, and a second data variable as a second path pointing to a data item being a value of said second data variable, in which the database further comprises a first frequency for each first data variable path type, and a second frequency for each second data variable path type, comprising:
    creating an intermediate array comprising a section for each second data variable path type, said sections of said intermediate array comprising identifier storage locations equal in number to the corresponding second frequency;
    storing the identifier of each record into the section of the intermediate array corresponding to its second data variable path type;
    creating a final array comprising sections for each first data variable path type, said sections of said final array comprising identifier storage locations equal in number to the corresponding first frequency;
    creating an offset array consisting of storage locations for each first data variable path type, said storage locations are populated with offset values, said offset values pointing to the first available identifier storage location in each section of the final array;
    storing the identifier of the records appearing in a first section of the intermediate array into the section of the final array corresponding to the value of its first data variable path type;
    incrementing the offset value each time the identifier for a record is stored into one of said sections of the final array;
    identifying offset points in the final array corresponding to the resulting offset value of each of said sections of the final array;
    repeating the previous three steps of storing, incrementing, and identifying for each further section of the intermediate array; and
    creating an offset point index consisting of offset points identified in each repetition.

2. A method according to claim 1, in which in the step of storing the identifier of the records appearing in a section of the intermediate array into the section of the final array corresponding to the data variable path type in question, a count is made of the number of said offset values which change, in which after each of those steps an offset point set is created comprising storage locations equal in number to said count, and in which, after the step of identifying offset points in the final array, these are stored in said storage locations of said offset point set.

3. A method according to claim 1, in which the first and second data variables path types comprised in each record are also stored in the intermediate and final arrays, and in which said sections of the intermediate array are arranged in a pre-determined second data variable path type order and said sections of the final array are arranged in a pre-determined first data variable path type order.

4. A method according to claim 1 in which each record also comprises one or more further data variables as paths, in which the database comprises one or more further frequencies for each further data variable path type, and in which the method comprises creating a sequence of final arrays, each one according to the method of claim 1, but in which the intermediate array comprises the preceding final array.

5. A method according to claim 4 in which the method comprises creating a sequence of final arrays.

6. A method according to claim 5 in which the first, second, and one or more further data variables comprised in each record are also stored in each final array in the sequence, and the sections of each final array in the sequence are arranged in pre-determined first data variable orders.

7. A computer system comprising a processor and memory and storing a database comprising a plurality of records and a plurality of data items, in which each record comprises an identifier, a first data variable as a path pointing to a data item being the value of said first data variable, and a second data variable as a path pointing to a data item being the value of said second data variable, characterized in that the database further comprises a first frequency for each first data variable path type, and a second frequency for each second data variable path type; and in which the computer system is configured to perform the method of claim 1.

8. A computer program product storing a program for carrying out the method of claim 1, including a non-transitory computer-readable medium.

* * * * *